US009497585B1

(12) United States Patent
Cooley et al.

(10) Patent No.: US 9,497,585 B1
(45) Date of Patent: Nov. 15, 2016

(54) SYSTEMS AND METHODS FOR MANAGING EMERGENCY INFORMATION

(71) Applicant: Symantec Corporation, Mountain View, CA (US)

(72) Inventors: Shaun Cooley, El Segundo, CA (US);
Charles Payne, Los Angeles, CA (US);
Henry Schaup, Portland, OR (US);
Vijay Perumal, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 14 days.

(21) Appl. No.: 14/025,770

(22) Filed: Sep. 12, 2013

(51) Int. Cl.
*H04W 4/02* (2009.01)
*H04W 64/00* (2009.01)
*H04L 29/08* (2006.01)

(52) U.S. Cl.
CPC .......... *H04W 4/02* (2013.01); *H04L 29/08657* (2013.01); *H04W 64/00* (2013.01)

(58) Field of Classification Search
CPC ......... H04W 4/22; H04W 4/12; H04W 4/14; H04W 4/18; H04W 4/02; H04W 4/00; H04W 4/21; H04W 8/00; H04W 8/18; H04W 64/00; H04W 64/003; H04W 64/006; H04W 68/10; H04W 68/02
USPC ......... 455/404.1, 404.2, 412.1, 412.2, 414.1, 455/414.2, 415, 456.1, 456.2, 456.3, 456.4, 455/456.5, 456.6, 457, 567
See application file for complete search history.

(56) References Cited

U.S. PATENT DOCUMENTS

| | | | | |
|---|---|---|---|---|
| 2005/0044359 A1* | 2/2005 | Eriksson | ............... | G06F 21/125 713/165 |
| 2005/0075116 A1* | 4/2005 | Laird | ....................... | A61B 5/04 455/456.3 |
| 2008/0299940 A1* | 12/2008 | Shaffer et al. | ............. | 455/404.2 |
| 2009/0286555 A1* | 11/2009 | Weinroth | ................ | H04W 8/10 455/456.3 |
| 2010/0003958 A1* | 1/2010 | Ray et al. | ................... | 455/404.2 |
| 2010/0100319 A1* | 4/2010 | Trinko | ................ | G01C 21/367 701/455 |
| 2010/0273452 A1* | 10/2010 | Rajann et al. | ................ | 455/411 |
| 2010/0317317 A1* | 12/2010 | Maier | .................. | H04W 64/00 455/404.2 |
| 2011/0081884 A1* | 4/2011 | Sennett et al. | ............. | 455/404.2 |

OTHER PUBLICATIONS

Publicengines; CrimeReports; www.crimereports.com; as accessed on Jun. 29, 2013.
The Omega Group; CrimeMapping; www.crimemapping.com; as accessed on Jun. 29, 2013.

(Continued)

*Primary Examiner* — Lester Kincaid
*Assistant Examiner* — William Wang
(74) *Attorney, Agent, or Firm* — ALG Intellectual Property, LLC

(57) ABSTRACT

A computer-implemented method for managing emergency information may include intercepting, on a mobile-computing device, an emergency communication being transmitted from the mobile-computing device. Intercepting the emergency communication may include monitoring outgoing communications on the mobile-computing device and determining that an outgoing communication being monitored is a communication about an emergency. This method may also include sending, from the mobile-computing device to a remote server that collects emergency data from a plurality of mobile-computing devices, information about the emergency communication and location information that identifies a location of the emergency. Various other methods, systems, and computer-readable media are also disclosed.

20 Claims, 8 Drawing Sheets

(56) References Cited

OTHER PUBLICATIONS

Bair Analytics; RaidsOnline; www.RAIDSOnline.com; as accessed on Jun. 29, 2013.
Spotcrime; mylocalcrime; www.mylocalcrime.com; as accessed on Jun. 29, 2013.
Trulia; www.trulia.com; as accessed on Jun. 29, 2013.
Reportsee Inc.; SpotCrime; www.spotcrime.com; as accessed on Jun. 29, 2013.

\* cited by examiner

SYSTEMS AND METHODS FOR MANAGING EMERGENCY INFORMATION

BACKGROUND

Traditional online crime-mapping services may obtain most of their crime data in one of two ways—by either subscribing to a crime-reporting service, or by mining the contents of digitalized crime reports provided by law enforcement agencies. The crime reports obtained in either process may be inconsistent, incomplete, or irrelevant. In addition, some crime-mapping services may provide little information about other emergencies, such as fires, car accidents, medical emergencies, etc. Finally, scaling traditional crime-mapping services to new areas may be a slow, tedious process.

Crime data taken from crime reports may be inconsistent, incomplete, or irrelevant for a variety of reasons. For example, each law enforcement agency may have different standards for reporting crime. This may make it difficult to compare the crime reports of one agency with the crime reports of another. Not every law enforcement agency releases their crime reports, and some agencies may not release data about a crime until the case is closed, which may take months or years. Other agencies may choose to withhold crimes of a sensitive nature. In some cases, each law enforcement agency may choose to release their crime reports at different intervals—one agency may release their reports every 24 hours, another once a week.

Traditional crime mapping services may also obtain crime data from other sources, such as news outlets. This may be a time-consuming and tedious way to find crime data. Other services may scrape data from existing crime-mapping services. This may be less time-consuming, but the data may be as unreliable as data from crime reports.

In addition to these problems, traditional methods of obtaining crime data may be difficult to scale. Contacting each law enforcement agency in a new area may be costly and time consuming. Obtaining crime reports may be complex and tedious, and growing to new areas may increase this complexity.

All of the above problems may make it difficult to provide consistent, complete, or relevant safety information to users. What is needed, therefore, is a more efficient and effective mechanism for obtaining and using information about crimes and other emergencies.

SUMMARY

As will be described in greater detail below, the instant disclosure generally relates to systems and methods for managing emergency information by sending intercepted information about emergency communications to a database and using the emergency communication information to provide safety ratings for a geographical region.

In one example, a computer-implemented method for managing emergency information may include intercepting, on a mobile-computing device, an emergency communication being transmitted from the mobile-computing device. Intercepting the outgoing emergency communication may include monitoring outgoing communications from the mobile-computing device and determining that an outgoing communication being monitored is a communication about an emergency. The method may also include sending, from the mobile-computing device to a remote server that collects emergency data from a plurality of mobile-computing devices, information about the emergency communication and location information that identifies a location of the emergency.

In one embodiment, monitoring the outgoing communications from the mobile-computing device may include monitoring telephone numbers dialed from the mobile computing device. Determining that the outgoing communication being monitored is a communication about an emergency may also include determining that a dialed telephone number is an emergency dispatch number.

In some examples, the method may additionally or alternatively include analyzing, on the mobile-computing device, the emergency communication to obtain information indicative of a nature of the emergency. In these examples, sending the information about the emergency communication may include sending information indicative of the nature of the emergency.

In one embodiment, the method may include recording, on the mobile-computing device, the emergency communication. In this embodiment, sending the information about the emergency communication may include sending the recording from the mobile-computing device to the remote server. Another embodiment of the method may include transmitting, from the mobile-computing device, location information that identifies a location to which a user of the mobile-computing device traveled after leaving the location of the emergency.

In some examples, the above-described method may be encoded as computer-readable instructions on a computer-readable-storage medium. For example, a computer-readable-storage medium may include one or more computer-executable instructions that, when executed by at least one processor of a computing device, cause the computing device to intercept, on a mobile-computing device, an emergency communication being transmitted from the mobile-computing device. As part of intercepting the emergency communication, the computer-executable instructions, when executed by at least one processor of the computing device, may cause the computing device to monitor outgoing communications from the mobile-computing device and then determine that an outgoing communication being monitored is a communication about an emergency. The instructions may also cause the computing device to send, from the mobile-computing device to a remote server that collects emergency data from a plurality of mobile-computing devices, information about the emergency communication and location information that identifies a location of the emergency.

In some embodiments, a computer-implemented method for managing emergency information may include receiving, from a plurality of mobile-computing devices, information about emergency communications that are intercepted while being sent from the mobile-computing devices. The method may also include identifying, based on location information received from the mobile-computing devices, geographical regions where emergencies associated with the emergency communications occurred. In some examples, the information about the emergency communication may be used to establish safety ratings for the geographical regions where the emergencies occurred.

In one embodiment of the above-described method, establishing the safety ratings for geographical regions may include, for each geographical region being rated, determining a total number of mobile-computing devices within the geographical region that are capable of providing information about emergency communications. The method may also include determining a volume of emergency communications received from the mobile-computing devices within the geographical region and normalizing the safety rating for the geographical region by comparing the total number of mobile-computing devices within the geographical region with the volume of emergency communications received from the mobile-computing devices within the geographical region.

In some embodiments, information about the emergency communications may include recordings of the emergency communications. In one example, establishing the safety ratings for the geographical regions may include, for each emergency communication, analyzing the recording of the emergency communication to identify key words indicative of the nature of the emergency identified by the emergency communication. In another example, establishing the safety ratings for the geographical region may include, for each emergency communication, analyzing the recording of the emergency communication to determine an intensity of the emergency communication.

In one embodiment, establishing the safety ratings for the geographical regions may include analyzing anti-theft submissions from one or more mobile-computing devices in the plurality of mobile-computing devices.

The method may additionally include, for each mobile-computing device in the plurality of mobile-computing devices, querying the mobile-computing device for information that identifies a location to which a user of the mobile-computing device traveled after leaving the location of an emergency and using the information that identifies the locations to which the users of the mobile-computing devices traveled to establish safety ratings for the geographical regions where the emergencies occurred.

In another example, the computer-implemented method may include determining that a mobile-computing device from the plurality of mobile-computing devices is located within or near a geographical region for which a safety rating has been established. The method may also include sending, to the mobile-computing device, information about the safety rating of the geographical region.

In some embodiments, the method may also include, but is not limited to, determining that an additional mobile-computing device is located near an emergency associated with an emergency communication received from a mobile-computing device in the plurality of mobile-computing devices and sending, to the additional mobile-computing device, information about the emergency.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to receive, from a plurality of mobile-computing devices, information about emergency communications that are intercepted while being sent from the mobile-computing devices, and identify, based on location information received from the mobile-computing devices, geographical regions where emergencies associated with the emergency communications occurred. The one or more computer-executable instructions may also cause the computing device to use the information about the emergency communications to establish safety ratings for the geographical regions where the emergencies occurred.

In some embodiments, a system for implementing the above-described method may include an interception module that intercepts, on a mobile-computing device, an emergency communication being transmitted from the mobile-computing device by monitoring outgoing communications from the mobile-computing device and determining that an outgoing communication being monitored is a communication about an emergency. The system may also include a transmission module that sends, from the mobile-computing device to a safety-ratings system that collects emergency data from a plurality of mobile-computing devices, information about the emergency communication and location information that identifies a location of the emergency. A reception module may receive, at the safety-ratings system, information about emergency communications that are intercepted while being sent from a plurality of mobile-computing devices (the plurality of mobile-computing devices may include the mobile-computing device). In addition, a location-identification module may identify, based on location information received from the mobile-computing devices, geographical regions where emergencies associated with the emergency communications occurred. The system may also include a ratings module that uses the information about the emergency communications to establish safety ratings for the geographical regions where the emergencies occurred. In addition, the system may include a display module that may display, via a graphical user interface, a map showing representations of the geographical regions and representations of the safety ratings of the geographical regions.

In some examples, a detection module may determine that, based on location data from at least one device in the plurality of mobile-computing devices, the mobile-computing device is within or near a geographical location for which safety-ratings alerts are being issued. A notification module may transmit an alert to the mobile-computing device, and the alert may indicate a safety rating of the geographical location. The notification module and the detection module may be located in the safety-rating system.

In one embodiment, the interception module may monitor the outgoing communications from the mobile-computing device by monitoring telephone numbers dialed from the mobile-computing device. The interception module may also determine that the outgoing communication being monitored is a communication about an emergency by determining that a dialed telephone number is an emergency dispatch number.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
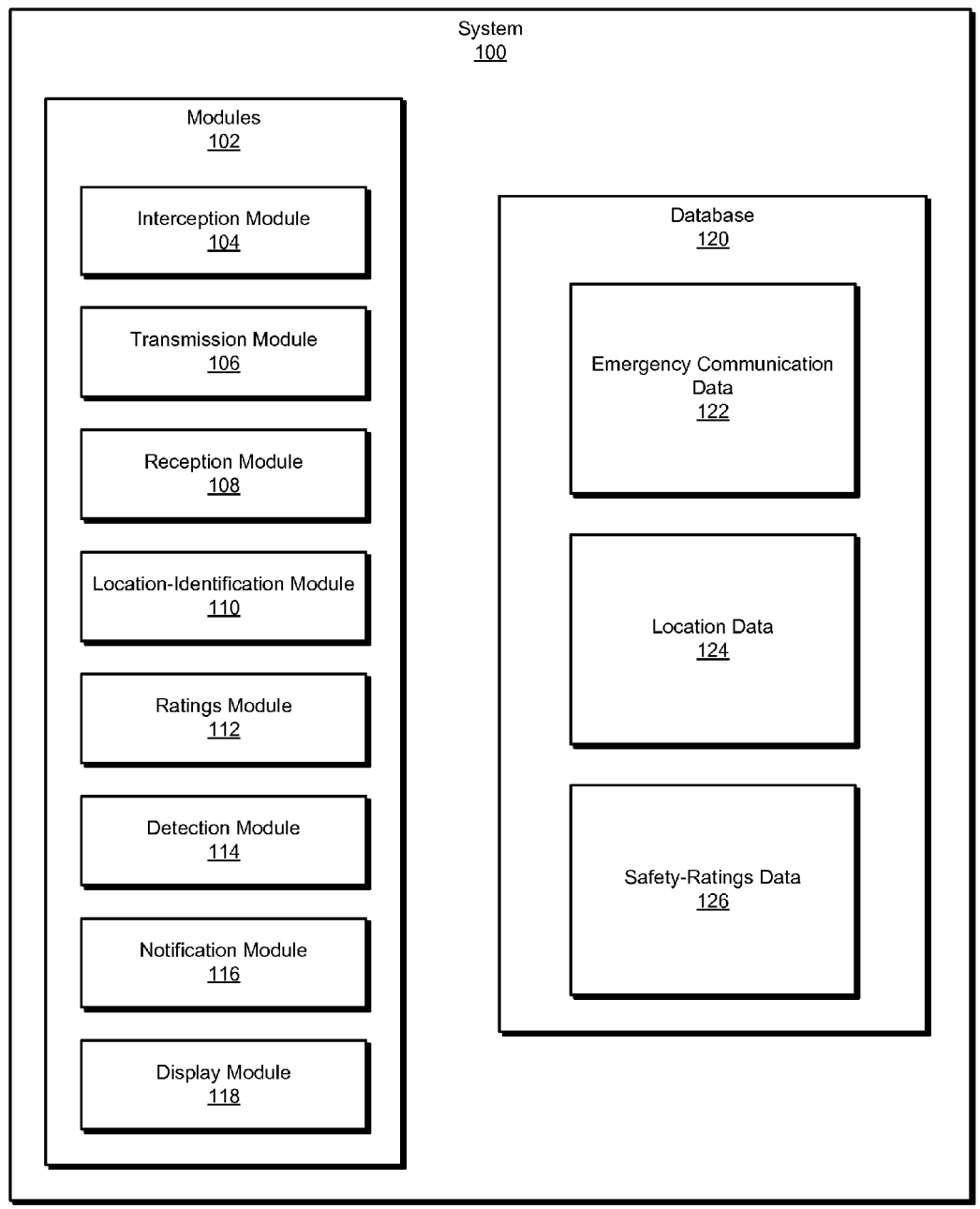
FIG. 1 is a block diagram of an exemplary system for managing emergency information.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for managing emergency information. As will be explained in greater detail below, the systems and methods described herein may provide a robust and accurate location rating system by intercepting emergency communications transmitted from mobile-computing devices and using information obtained from the emergency communications to establish ratings for geographical regions.

Figure 2:
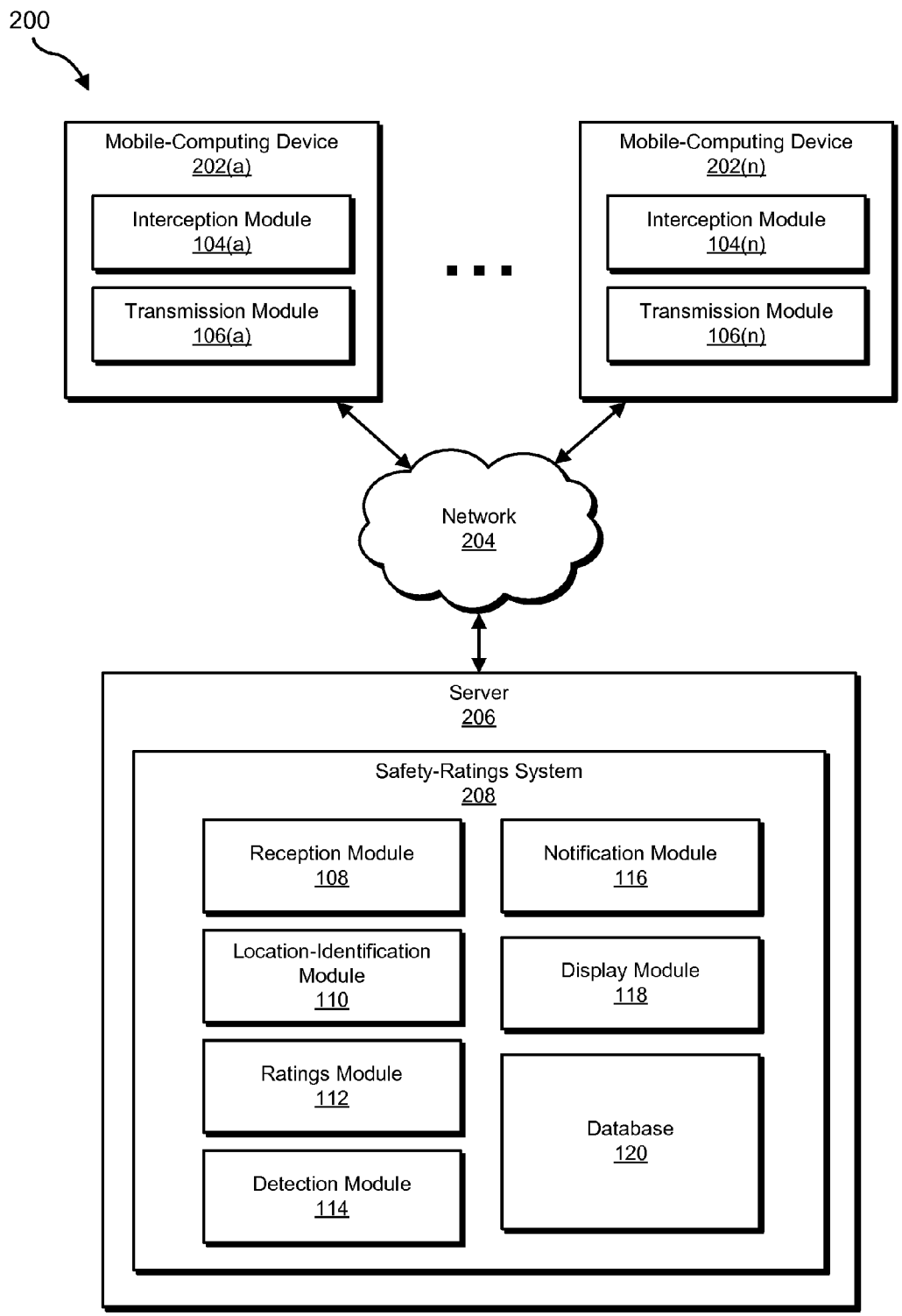
FIG. 2 is a block diagram of another exemplary system for managing emergency information.

The following will provide, with reference to FIGS. 1-2, detailed descriptions of exemplary systems for managing emergency information. Detailed descriptions of corresponding computer-implemented methods will also be provided in connection with FIGS. 3 and 4. Descriptions of exemplary geographical locations are provided in the description of FIG. 5, and descriptions of an exemplary ratings map are provided in the description of FIG. 6. In addition, detailed descriptions of an exemplary computing system and network architecture capable of implementing one or more of the embodiments described herein will be provided in connection with FIGS. 7 and 8, respectively.

FIG. 1 is a block diagram of an exemplary system 100 for managing emergency information. As illustrated in this figure, exemplary system 100 may include one or more modules 102 for performing one or more tasks. For example, and as will be explained in greater detail below, exemplary system 100 may include an interception module 104 that intercepts, on a mobile-computing device, an emergency communication being transmitted from the mobile-computing device by monitoring outgoing communications from the mobile-computing device and determining that an outgoing communication being monitored is a communication about an emergency. Exemplary system 100 may also include a transmission module 106 that sends, from the mobile-computing device to a safety-ratings system that collects emergency data from a plurality of mobile-computing devices, information about the emergency communication and location information that identifies a location of the emergency.

In addition, and as will be described in greater detail below, exemplary system 100 may include a reception module 108 that receives information about emergency communications that are intercepted while being sent from a plurality of mobile-computing devices. Exemplary system 100 may also include a location-identification module 110 that identifies, based on location information received from the mobile-computing devices, geographical regions where emergencies associated with the emergency communications occurred. In addition, exemplary system 100 may include a ratings module 112 that uses the information about the emergency communications to establish safety ratings for the geographical regions where the emergencies occurred.

In some embodiments, exemplary system 100 may include a detection module 114 that determines that, based on location data from at least one mobile-computing device in the plurality of mobile-computing devices, the mobile-computing device is within or near a geographical location for which safety-rating alerts are being issued. Additionally, exemplary system 100 may include a notification module 116 that transmits an alert to the mobile-computing device. The alert may indicate a safety rating of the geographical location. As shown in system 200, notification module 116 and detection module 114 may be located in safety-ratings system 208. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., mobile-computing devices 202(*a*)-(*n*) and/or server 206), computing system 710 in FIG. 7, and/or portions of exemplary network architecture 800 in FIG. 8. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store emergency communication data 122, location data 124, and safety-ratings data 126. Emergency communication data 122 may include information about emergency communications that are intercepted on and transmitted from a mobile-computing device. Location data 124 may include information that describes the location of a mobile-computing device at a given time of day. Safety-ratings data 126 may include safety ratings of various geographical regions.

Database 120 may represent portions of a single database or computing device or a plurality of databases or computing devices. For example, database 120 may represent a portion of server 206 in FIG. 2, computing system 710 in FIG. 7, and/or portions of exemplary network architecture 800 in FIG. 8. Alternatively, database 120 in FIG. 1 may represent one or more physically separate devices capable of being accessed by a computing device, such as server 206 in FIG. 2, computing system 710 in FIG. 7, and/or portions of exemplary network architecture 800 in FIG. 8.

Exemplary system 100 in FIG. 1 may be implemented in a variety of ways. For example, all or a portion of exemplary system 100 may represent portions of exemplary system 200 in FIG. 2. As shown in FIG. 2, system 200 may include mobile-computing devices 202(*a*)-(*n*) in communication with a server 206 via a network 204. Mobile-computing devices 202(*a*)-(*n*) may be programmed with one or more of modules 102 and/or may store all or a portion of the data in database 120. Additionally or alternatively, a safety-ratings system 208 on server 206 may be programmed with one or more of modules 102 and/or may store all or a portion of the data in database 120.

In some embodiments, mobile-computing devices 202(a)-(n) may include any number of mobile-computing devices within one or more geographical regions. Some or all of mobile-computing devices 202(a)-(n) may include one or more modules 102. In one embodiment, one or more of modules 102 from FIG. 1 may, when executed by at least one processor on any mobile-computing device 202(a)-(n) and/or server 206, cause mobile-computing devices 202(a)-(n) and/or server 206 to manage emergency information. In some embodiments, any modules 102 that are executed by a processor on mobile-computing device 202(a) may alternatively or additionally be executed by one or more processors on one or more of mobile-computing devices 202(a)-(n).

In one embodiment, all or part of server 206 may include a safety-ratings system 208 that collects emergency data from a plurality of mobile-computing devices 202(a)-(n). Safety-ratings system 208 may also include some or all of database 120. As will be described in greater detail below, database 120 may store emergency information and location information received from mobile-computing devices 202(a)-(n). In some exemplary embodiments, safety-ratings system 208 may be implemented across multiple servers and databases in any suitable configuration.

The following description of mobile-computing device 202(a) may apply to any other mobile computing device. In one example, interception module 104(a) may intercept an emergency communication being transmitted from mobile-computing device 202(a). Interception module 104(a) may intercept the emergency communication by monitoring outgoing communications from mobile-computing device 202(a) and determining that an outgoing communication being monitored on mobile-computing device 202(a) is a communication about an emergency. Transmission module 106(a) may send, from mobile-computing device 202(a) to safety-ratings system 208 via network 204, information about the emergency communication and location information that identifies a location of the emergency.

In some embodiments, reception module 108 may receive, at safety-ratings system 208, information about emergency communications and location information transmitted by transmission modules 106(a)-(n). Emergency communication data 122, which may be stored on database 120, may include data about the emergency communications received by reception module 108 from one or more of mobile computing device 202(a)-(n). Additionally or alternatively, location data 124, which may also be stored on database 120, may include location information received by reception module 108.

In some configurations of safety-ratings system 208, location-identification module 110 may identify, based on information stored in location data 124, geographical regions where emergencies associated with the emergency communications occurred. In one example, safety-ratings system 208 may add data about identified geographical regions to location data 124. In some embodiments, ratings module 112 may use information contained in emergency communication data 122 and location data 124 to establish safety ratings for the geographical regions where the emergencies occurred. Safety-ratings system 208 may store the ratings established by ratings module 122 in safety-ratings data 126.

Additionally or alternatively, safety-ratings system 208 may include detection module 114 that determines that, based on location data from an additional mobile-computing device 202(n), the additional mobile-computing device 202(n) is within or near a geographical location for which safety-rating alerts are being sent. In some embodiments, safety-ratings system 208 may also include a notification module 116 that transmits an alert to mobile-computing device 202(n). The alert may indicate a safety rating of the geographical location that mobile-computing device 202(n) is within or near.

Some or all of mobile-computing devices 202(a)-(n) generally represent any type or form of mobile-computing device capable of reading computer-executable instructions. Examples of mobile-computing devices 202(a)-(n) may include, without limitation, laptops, tablets, cellular phones, Personal Digital Assistants (PDAs), multimedia players, embedded systems, combinations of one or more of the same, or any other suitable computing device.

Server 206 generally represents any type or form of computing device with a safety-ratings system 208 that is capable of managing emergency information. Examples of server 206 include, without limitation, application servers and database servers configured to provide various database services and/or run certain software applications. In one example, server 206 may be a server owned by a security software publisher and may receive information about emergency communications from mobile-computing devices configured with security clients.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 800 in FIG. 8, or the like. Network 204 may facilitate communication or data transfer using wireless or wired connections. In one embodiment, network 204 may facilitate communication between mobile-computing devices 202(a)-(n) and server 206.

Figure 3:
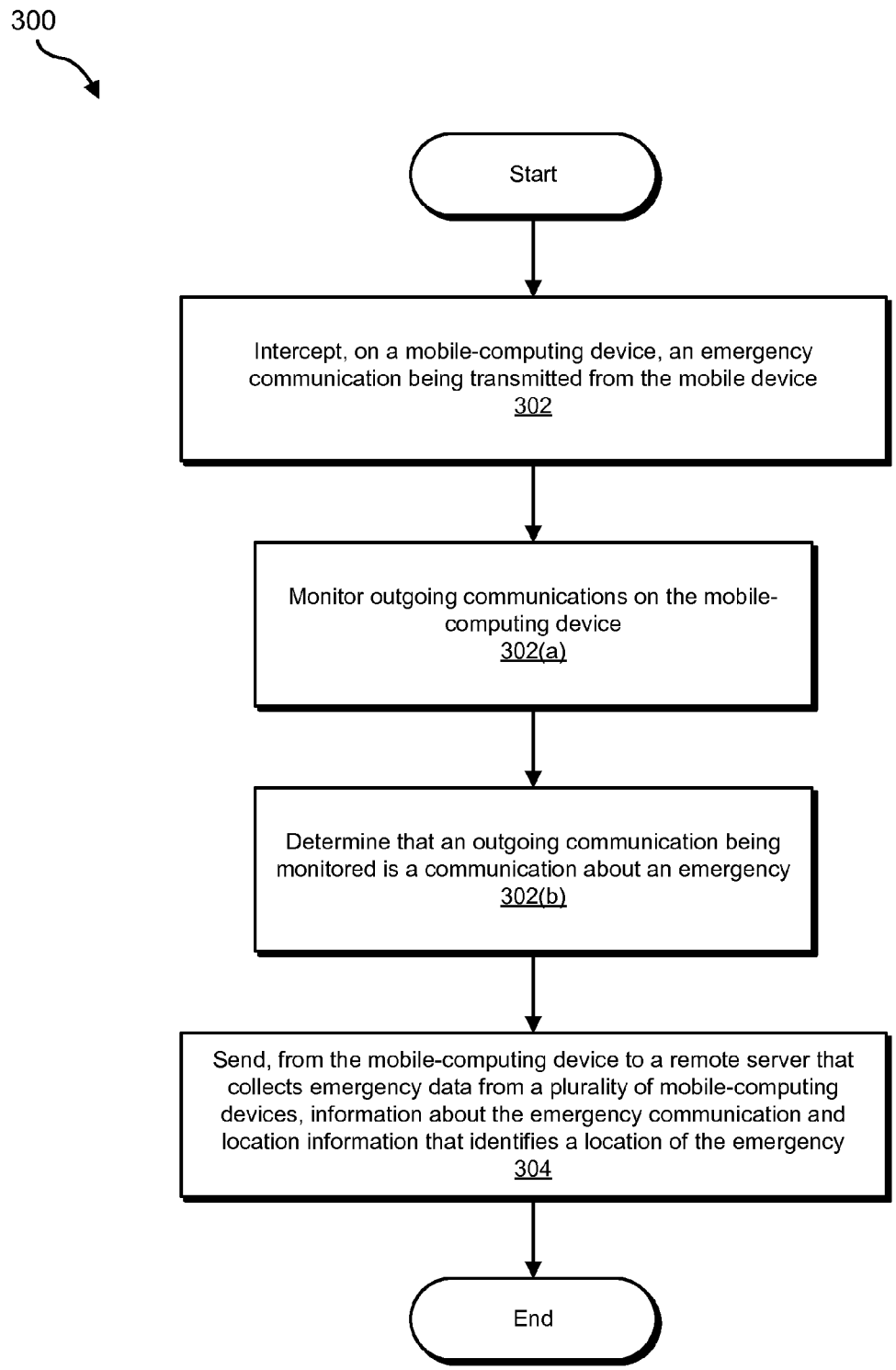
FIG. 3 is a flow diagram of an exemplary method for managing emergency information.

FIG. 3 is a flow diagram of an exemplary computer-implemented method 300 for managing emergency information. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 710 in FIG. 7, and/or portions of exemplary network architecture 800 in FIG. 8.

As illustrated in FIG. 3, at step 302 one or more of the systems described herein may intercept, on a mobile-computing device, an emergency communication being transmitted from the mobile-computing device. For example, at step 302 interception module 104(a) may, as part of mobile-computing device 202(a) in FIG. 2, intercept an emergency communication being transmitted from mobile-computing device 202(a).

As used herein, the phrase "emergency communication" generally refers to any type or form of communication about an emergency. For example, the phrase "emergency communication" may describe any communication that refers to an emergency, describes an emergency, indicates an emergency has occurred, specifies a type of an emergency, identifies a location of an emergency, or contains any other information about or related to an emergency. Emergency communications may include phone calls, text messages, instant messages, VoIP communications, or any other suitable way to transmit information about an emergency from a mobile-computing device. For example, a user of mobile-computing device 202(a) may call 911 to report a crime. In another example, a user of mobile-computing device 202(a) may send a text message to a friend about a recent shooting in a nearby neighborhood.

Emergency communications may include communications about any kind of emergency. In some embodiments, mobile-computing device 202(a) may transmit an emergency communication about crimes, such as robberies, shootings, sexual assaults, kidnappings, theft, etc. In some examples, an emergency communication transmitted from mobile-computing device 202(a) may include communications about other kinds of emergencies, such as fires, traffic accidents, road hazards, roadside assistance incidents, air quality issues, inclement weather, hazardous materials accidents, chemical/biological/radiological emergencies, aircraft crashes, natural disasters, emergency evacuations, environmental hazards, medical or health emergencies, power outages, exposed electrical lines, food shortages, civil disorder or riots, national emergencies (e.g., war or terrorism), viral outbreaks, food/water/air contamination, or about any other situation or occurrence that could be considered an emergency.

Interception module 104(a) may intercept emergency communications in a variety of ways. For example, interception module 104(a) may monitor outgoing communications on mobile-computing device 202(a) and then determine that an outgoing communication being monitored is a communication about an emergency (steps 302(a) and (b)).

Interception module 104(a) may monitor outgoing communications in a variety of ways. In some embodiments, interception module 104(a) may detect attempts to initiate communications and/or transmit information from mobile-computing device 202(a). For example, interception module 104(a) may monitor telephone communications from mobile-computing device 202(a) by detecting attempts to make telephone calls from mobile-computing device 202(a). Interception module 104(a) may detect attempts to make telephone calls by monitoring outgoing cellular communications, by monitoring a telephone app on mobile-computing device 202(a), by monitoring an Application Programming Interface (API) used in making phone calls, and/or in any other suitable manner.

As another example of monitoring outgoing communications, interception module 104(a) may monitor text messages, emails, Voice over IP (VoIP) communication and/or other digital communications from mobile-computing device 202(a). Interception module 104(a) may monitor such digital communications by monitoring outgoing communications from particular applications (e.g., VoIP apps, emails apps, texting apps, etc.), by monitoring APIs used in processing digital communications, by monitoring data being sent from computing device 202(a), and/or in any other suitable manner.

As mentioned above, in additional to monitoring outgoing communications, interception module 104(a) may determine whether the communications being monitored are communications about an emergency. Interception module 104(a) may determine whether monitored communications are emergency communications in many different ways. In some embodiments, interception module 104(a) may determine that a communication is an emergency communication by determining that an intended recipient of the communication is an emergency responder (e.g., a police department, a fire department, an emergency call center, a roadside assistance company, a poison control center, a suicide hotline, etc.). For example, interception module 104(a) may determine that a telephone number being dialed is an emergency dispatch number (e.g., 911, a fire department number, a police department number, etc.). As another example, interception module 104(a) may determine that a recipient of a text message is an emergency responder.

Interception module 104(a) may also determine whether monitored communications are emergency communications by examining content and/or context of the communications. For example, interception module 104(a) may track the time of calls dialed to emergency numbers and may determine that calls to emergency numbers with very short durations (e.g., less than one or two seconds) are accidental calls and are not emergency communications. Additionally or alternatively, interception module 104(a) may analyze the content of a communication to determine whether the communication includes key words and/or phrases that suggest the communication is about an emergency.

As illustrated in FIG. 3, at step 304 one or more of the systems described herein may send, from a mobile-computing device to a remote server that collects data from a plurality of mobile-computing devices, information about an emergency communication and location information that identifies a location of an emergency. For example, transmission module 106(a) may send, from mobile-computing device 202(a) to server 206, information about an intercepted emergency communication. Transmission module 106(a) may also send, from mobile-computing device 202(a) to server 206, location information that identifies a location of the emergency associated with the emergency communication.

As noted, transmission module 106(a) may send information about an emergency communication to server 206. As used herein, the phrase "information about an emergency communication" generally refers to any type or kind of information about an emergency communication that may be sent from a mobile-computing device. For example, information about an emergency communication may include the date and/or time the communication was transmitted from a mobile-computing device, a unique identifier of the mobile-computing device (e.g., IMEI or IMSI or any other information that uniquely identifies the mobile-computing device or a user of the mobile-computing device), a duration of the communication, and/or emergency keywords identified in the communication. In embodiments where the emergency communication is a text message, email, VoIP communication, or other digital communication, information about the emergency communication may include a digital copy of the emergency communication. In embodiments where the emergency communication is a cellular communication, information about an emergency communication may include an analog or digital recording of the cellular communication.

Transmission module 106(a) may send information about an emergency communication to server 206 at different times and/or intervals. For example, transmission module 106(a) may send information about an emergency communication in real time (i.e., at the same time the emergency communication is transmitted from mobile-computing device 202(a)) or at any time after the emergency communication is transmitted. In some embodiments, transmission module 106(a) may be configured to send information about an emergency communication at predetermined intervals. For example, transmission module 106(a) may be configured to send information about emergency communications once a day, once a week, once a month, etc. In another example, transmission module 106(a) may send information about an emergency communication in response to a query from server 206.

As noted above, transmission module 106(a) may also send, from mobile-computing device 202(a) to server 206, location information that identifies a location of the emergency associated with the emergency communication. In some embodiments, transmission module 106(a) may send location information with (e.g., in the same communication as) information about the emergency communication. Alternatively, transmission module 106(a) may transmit location information to server 206 independent from information about the emergency communication.

Location information may include data obtained from a variety of mobile-positioning systems. For example, location information may include data obtained using network-based positioning, SIM-based positioning, trilateration (e.g., GPS), multilateration (e.g., GSM localization), triangulation, crowd-sourced Wi-Fi, hybrid positioning systems (e.g., Assisted GPS), any kind of Near Location Based Services (NLBS), or any other process capable of determining or gathering information about the location of a mobile-computing device. In some embodiments, location information may include information about physical addresses, such as city names, street addresses, cross streets, etc. In one embodiment, location information may be location data obtained from an application running on the mobile-computing device (e.g., GOOGLE MAPS).

Location information may also include user-provided location data. For example, location information may include location keywords obtained from a telephone call or text message. In another example, server 206 may query mobile-computing device 202(a) for location information. In response, transmission module 106(a) may automatically send location information or may prompt a user of mobile-computing device 202(a) to provide location information.

In some embodiments, transmission module 106(a) may send location information to server 206 at different times and/or intervals. For example, module 106(a) may send location information in real time (i.e., at the same time the emergency communication is transmitted from mobile-computing device 202(a)) or any time after the emergency communication is transmitted. In some embodiments, transmission module 106(a) may be configured to send location information at predetermined intervals. For example, transmission module 106(a) may be configured to send location information once a day, once a week, once a month, etc. In another embodiment, transmission module 106(a) may send location information in response to a query from server 206.

In some embodiments, transmission module 106(a) may collect location information on a mobile-computing device in a variety of ways. For example, transmission module 106(a) may collect location information by monitoring mobile positioning systems or other location-based services on mobile-computing device 202(a). In some embodiments, transmission module 106(a) may collect location information on a mobile-computing device by monitoring APIs used in mobile positioning systems or monitoring apps that make use of mobile positioning systems. In one embodiment, transmission module 106(a) may collect location information by monitoring an emergency communication and detecting location keywords (e.g., street addresses) in the emergency communication. For example, transmission module 106(a) may detect location keywords in cellular communications, emails, text messages, VoIP, etc., by monitoring APIs used in transmitting emergency communications, by monitoring apps capable of transmitting emergency communications, or by any other process capable of detecting location keywords in an emergency communication. In another embodiment, a mobile-positioning system may be configured to send location information to transmission module 106(a).

Figure 4:
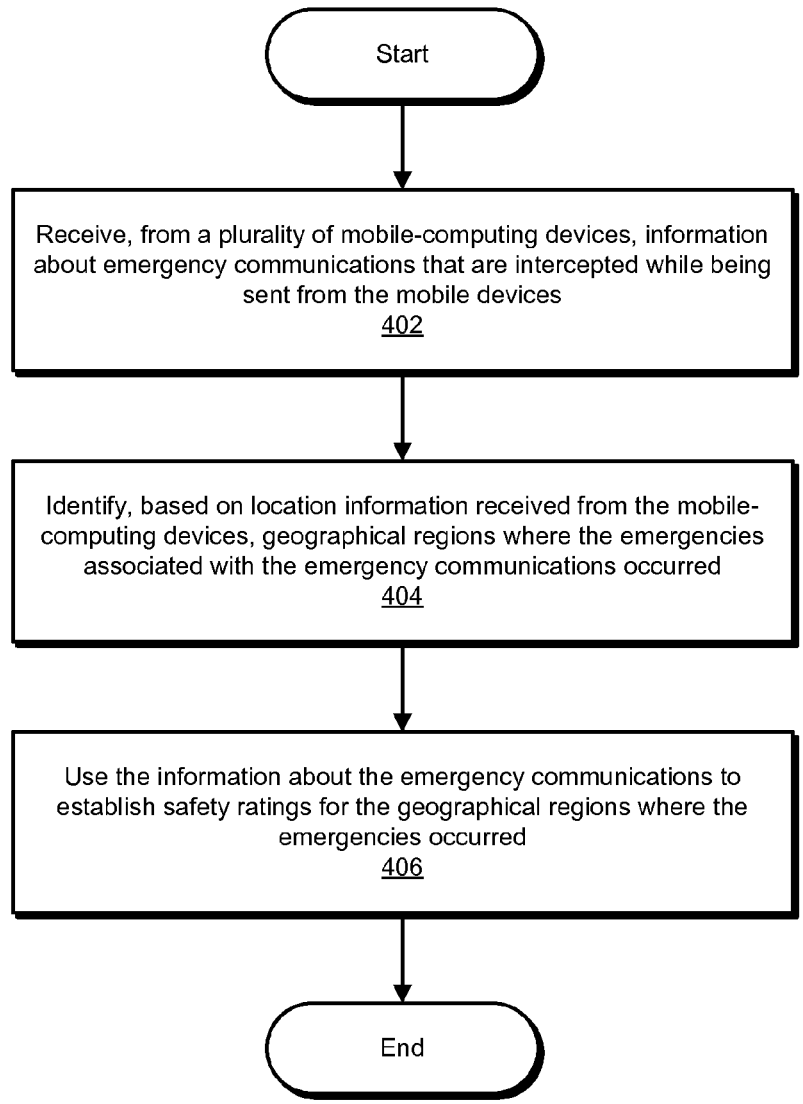
FIG. 4 is a flow diagram of another exemplary method for managing emergency information.

As noted above, the steps shown in FIG. 3 may be performed on or by a mobile-computing device, such as mobile-computing device 202(a), and the steps shown in FIG. 4 may be performed on or by a remote server, such as server 206. As shown in step 402 of FIG. 4, one or more of the systems described herein may receive, from a plurality of mobile-computing devices, information about emergency communications that are intercepted while being sent from the mobile-computing devices. For example, reception module 108 may receive, as part of safety-ratings system 208 on server 206, information about emergency communications that are intercepted while being sent from mobile-computing devices 202(a)-(n).

Reception module 108 may be configured to receive information about emergency communications in any suitable manner. For example, reception module 108 may receive information about emergency communications by receiving emergency communication data submissions sent from one or more of mobile-computing devices 202(a)-(n). An emergency communication data submission may be any kind communication or transmission (analog or digital) that includes information about emergency communications. In some embodiments, reception module 108 may receive information about emergency communications at predetermined intervals. For example, reception module 108 may receive information about emergency communications once a day, once a week, once a month, etc. In one embodiment, safety ratings system 208 may query one or more of mobile-computing devices 202(a)-(n) for information about emergency communications. In some examples, safety-ratings system 208 may send queries for information about emergency communications at predetermined intervals (once a day, once a week, once a month, etc.). In one example, reception module 108 may receive information about emergency communications in real time (i.e., when emergency communications are intercepted) or any time after emergency communications are intercepted.

In some embodiments, information about an emergency communication may include location information that identifies a location of an emergency identified in the emergency communication. For example, safety-ratings system 208 may receive mobile-positioning data from mobile-computing devices 202(a)-(n) that identifies locations of various emergencies.

Safety-ratings system 208 may be configured to receive information about emergency communications across one or more servers (e.g., server 206) and via one or more networks. For example, multiple servers and/or networks in safety-ratings system 208 may be configured with instances of reception module 108. In this example, each server or network may receive information about emergency communications from a different geographical region or group of geographical regions.

Information about emergency communications may be received by safety-ratings system 208 via any type of network 204. For example, reception module 108 may receive information about emergency communications via a cellular network, the Internet, or any other kind of network capable of transmitting analog or digital communications or information. In some embodiments, reception module 108 may receive information about emergency communications via network 204 using a variety of application layer protocols, such as FTP, HTTP, HTTPS, IMAP, etc.

Reception module 108 may receive information about emergency communications from any type of mobile-computing device. For example, reception module 108 may receive information about emergency communications from cellular phones, handheld devices, smartphones, tablets, netbooks, notebooks, laptops, wearable computers (e.g., smartwatches), PDAs, handheld game consoles, portable media players, Personal Navigation Devices (PNDs), pagers, any kind of mobile internet device, or any other kind of mobile-computing device capable of transmitting information about emergency communications.

Reception module 108 may receive information about emergency communications from any number of mobile-computing devices. For example, reception module 108 may receive information about emergency communications from thousands of mobile-computing devices that are located in a major city. In another example, reception module 108 may receive information about emergency communications from hundreds of mobile-computing devices that are located in a small town. In some embodiments, reception module 108 may receive information about emergency communications from security clients (e.g., security software owned by a security software publisher) running on one or more mobile-computing devices 202(a)-(n).

Safety-ratings system 208 may store information about emergency communications in database 120 in a variety of ways. For example, reception module 108 may receive information about emergency communications from mobile-computing devices 202(a)-(n), and safety-ratings system 208 may store that information in database 120. In some embodiments, information about emergency communications may be stored as emergency communication data 122, and location information that indicates a location of the emergency may be stored as location data 124. In at least one embodiment, information about emergency communications may be stored across multiple servers or in any other configuration suitable for storing emergency communication data.

At step 404 in FIG. 4, one or more of the systems described herein may identify, based on location information received from the mobile-computing devices, geographical regions where the emergencies associated with the emergency communications occurred. For example, location-identification module 110 may identify, based on location data 124, geographical regions where the emergencies associated with emergency communications occurred.

As used herein, the phrase "geographical region" generally refers to any type or kind of location or region. For example, the phrase "geographical region" may refer to a city, state, country, territory, province, county, area code, zip code, neighborhood, street, building, house, structure, landmark, set of boundaries defined by coordinates, etc. In some embodiments, a geographical region may be part of another geographical region. For example, a country region may contain one or more state regions, state regions may contain one or more city regions, city regions may contain one or more neighborhood regions, etc.

Safety-ratings system 208 may, for a variety of purposes, define, use, or create arbitrary or symbolic geographical regions. For example, safety-ratings system 208 may create a geographical region referred to as "The West Coast." "The West Coast" may be a symbolic region that includes all states along the western coast of the United States. In this example, server 206 may receive, from devices located within "The West Coast," information about emergency communications. In some examples, an additional server (configured with safety-ratings system 208) may receive, from an additional geographical region referred to as "The East Coast," information about emergency communications from devices located along the east coast of the United States. Safety-ratings system 208 may use arbitrary or symbolic geographical regions to establish safety ratings, categorize location data, create safety maps, and/or to perform any other suitable process or function described herein.

Location identification module 110 may identify geographical regions in a variety of ways. In some embodiments, location identification module 110 may analyze mobile-positioning data stored as location data 122 to identify geographical regions where emergencies occurred. For example, location identification module 110 may identify that, based on mobile-positioning data in location data 122, that the location of an emergency is in a city, a town, at a school, etc. In some embodiments, location identification module 110 may analyze key words (e.g., from a recording of an emergency communication) to identify a location where an emergency occurred. In one embodiment, in response to receiving information about emergency communications, safety-ratings system 208 may query one or more mobile-computing devices 202(a)-(n) for location information about the emergency associated with the emergency communication. Mobile-computing devices 202(a)-(n) may then send that data to safety-ratings system 208.

At step 406 in FIG. 4, one or more of the systems described herein may use the information about the emergency communications to establish safety ratings for the geographical regions where emergencies have occurred and been identified. For example, ratings module 112 may use data stored in database 120 to establish safety ratings for geographical regions where emergencies occurred. In at least one embodiment, ratings module 112 may store safety ratings as safety-ratings data 126.

The phrase "safety ratings," as used herein, generally refers to any type or kind of rating that indicates how safe a geographical region is. A safety rating may include a number, a phrase, or key word indicating the safety of a geographical region, a heat map (i.e., a graphical representation of data where values are represented as colors or other markings), any kind of map or geographical representation used to describe the safety of one or more geographical regions, any kind of symbol or imagery used to indicate the safety of a geographical region, or any other representation used to depict, categorize, and/or indicate the safety of a geographical region.

Safety ratings may be calculated using any information carried or inferred by information about emergency communications. For example, safety ratings may be based on the types of emergency communications received, the intensity of emergency communications, entities to which the emergency communications are directed (e.g., a police department, a fire department, an emergency dispatch center, etc.), times when emergencies occurred, and/or any other suitable factors.

As noted, a recording of an emergency communication may be stored in database 120 as emergency communication data 122. As part of establishing the safety rating for a geographical region, ratings module 112 may analyze the recording of one or more emergency communications to determine the intensity of the emergency communications. Ratings module 112 may determine the intensity of an emergency communication by analyzing a recording for a volume of the caller, a duration of the call, Natural Language Processed (NLP) key words (e.g., expletives) in the recording, and/or any other information about the recording to determine the intensity of the emergency communication. Ratings module 112 may use the information about the intensity of the emergency in calculating an empirical safety score for a geographical region (such as the geographical regions depicted in FIG. 5).

As discussed in a previous paragraph, ratings module 112 may establish safety ratings for geographical regions by analyzing anti-theft submissions from one or more mobile-computing devices 202(a)-(n). In some embodiments, anti-theft submissions may be received along with or as part of the information about emergency communications received by reception module 108. As used herein, the phrase "anti-theft submissions" generally refers to any kind of data that identifies, describes, or indicates an attempt made by a user of mobile-computing device 202(a) to activate an anti-theft process or mechanism. For example, a user of a cell phone may, after the loss or theft of their phone, activate a "Lock," "Wipe," or "Sneak Peak" command. In this example, the "Lock" command may prevent anyone from using the phone, the "Wipe" command may delete or clear all data on the phone, and the "Sneak Peak" command may cause the phone to take a picture (in hopes that the picture reveals who has the phone or the location of the phone).

An anti-theft submission for mobile-computing device 202(a) may include the location of the phone at the time a user activated an anti-theft command. For example, a cell phone may submit, as part of an anti-theft submission, its own GPS coordinates anytime it receives a "Lock", "Wipe", or "Sneak Peak" command. In one embodiment, the anti-theft submission may also include a date and time stamp that indicates when an anti-theft process or mechanism was activated. In some examples, an anti-theft submission may include a unique device identifier or a hash of a unique device identifier (e.g., IMEI or IMSI).

In some embodiments, ratings module 112 may analyze anti-theft submissions to determine the probability of a theft incident. For example, ratings modules 112 may determine, based on information in an anti-theft submission, that a cell phone received a "Lock" and "Wipe" command, but never received an "Unlock" command. In this example, ratings module 112 may determine that the cell phone was never recovered and, therefore, possibly stolen. In some embodiments, ratings module 112 may use these kinds of determinations and any other kinds of anti-theft determinations to establish safety ratings for geographical regions.

Figure 5:
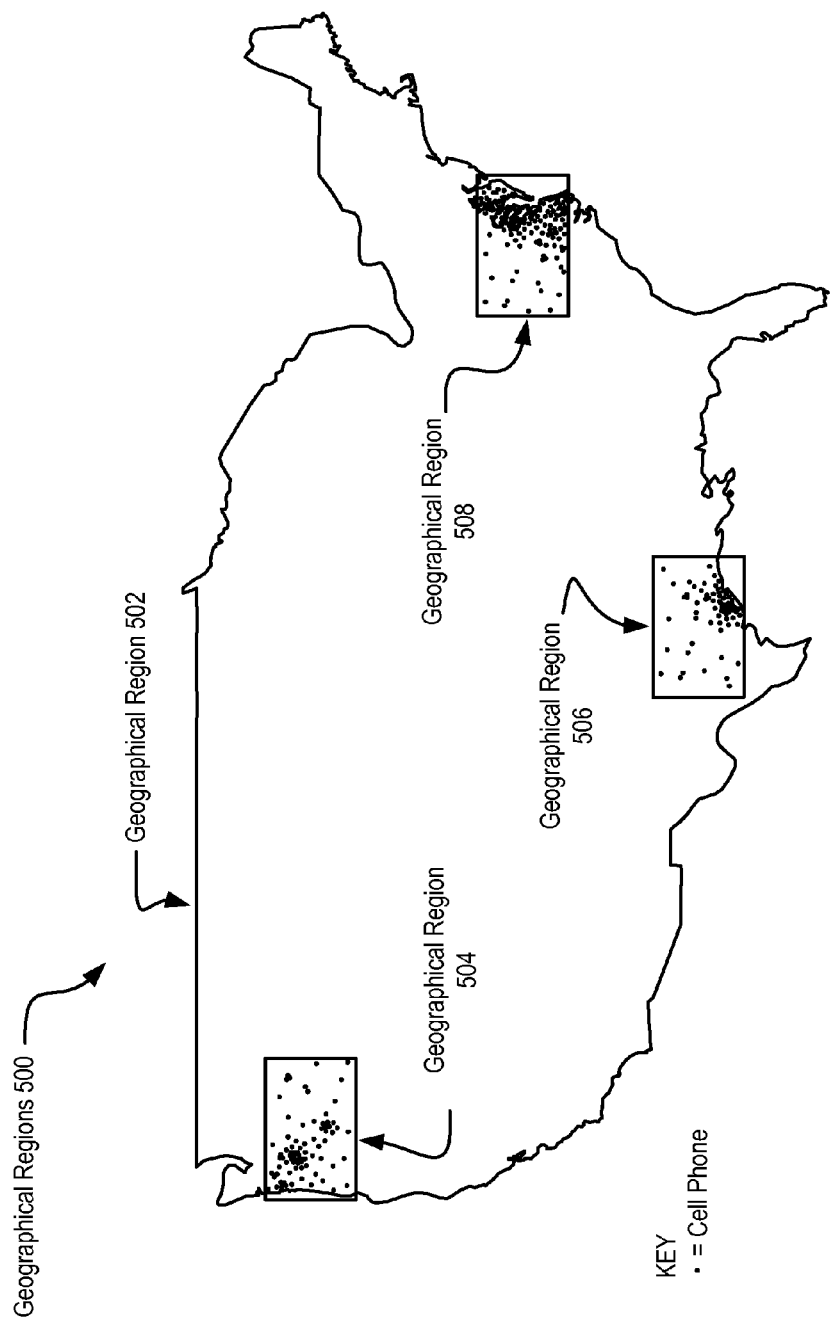
FIG. 5 is a block diagram of exemplary geographical regions according to embodiments of the instant disclosure.

FIG. 5 provides an exemplary illustration of geographical regions. Geographical regions 500 contains multiple geographical regions. For example, geographical region 502 may be a country, such as the United States, and may include a geographical region 504, a geographical region 506, and a geographical region 508. Geographical regions 504, 506, and 508 may be major cities, regions around major cities, multiple cities, states, parts of states, multiple states, etc., and may contain, within their boundaries, other exemplary geographical regions. Any number of mobile-computing devices 202(a)-(n) (such as cell phones) may be located in each geographical region 502, 504, 506, and 508.

Ratings module 112 may use information about emergency communications to establish the safety ratings in a variety of ways. For example, ratings module 112 may establish safety ratings by analyzing and/or comparing data stored in emergency communication data 122 and location data 124. In some embodiments, for each geographical region being rated, ratings module 112 may determine, within a geographical region, a total number of mobile-computing devices 202(a)-(n) that are capable of providing information about emergency communications. For example, ratings module 112 may determine that a total number of mobile-computing devices 202(a)-(n), located within geographical regions 502, 504, 506, or 508, are capable of providing information about emergency communications (e.g., a total number of devices with software capable of collecting and sending information about emergency communications). Additionally, ratings module 112 may determine a volume of emergency communications received from geographical regions 502, 504, 506, or 508. In some embodiments, ratings module 112 may normalize the safety rating for geographical regions 502, 504, 506, or 508 by comparing the total number of mobile-computing devices 202(a)-(n) with the volume of emergency communications received.

As an example of the above, ratings module 112 may determine that, within geographical region 504, 100,000 cell phones are capable of providing information about emergency calls to safety-ratings system 208. Ratings module 112 may also determine that 10,000 of these cell phones have submitted information about emergency calls. In this example, ratings module 112 may normalize the safety rating for geographical region 504 by comparing the number of emergency data submissions from the 10,000 cell phones with the total number of cell phones in that region. Ratings module 112 may, based on this comparison, assign an empirical safety score to geographical region 504. An empirical safety score may be a number on a scale or any other way to rate the overall safety of a geographical region, such that the rating could be compared to ratings of other geographical regions. The empirical score may be based on any information, such as the rate, type, density, severity, etc. of emergency events in a geographical region.

Figure 6:
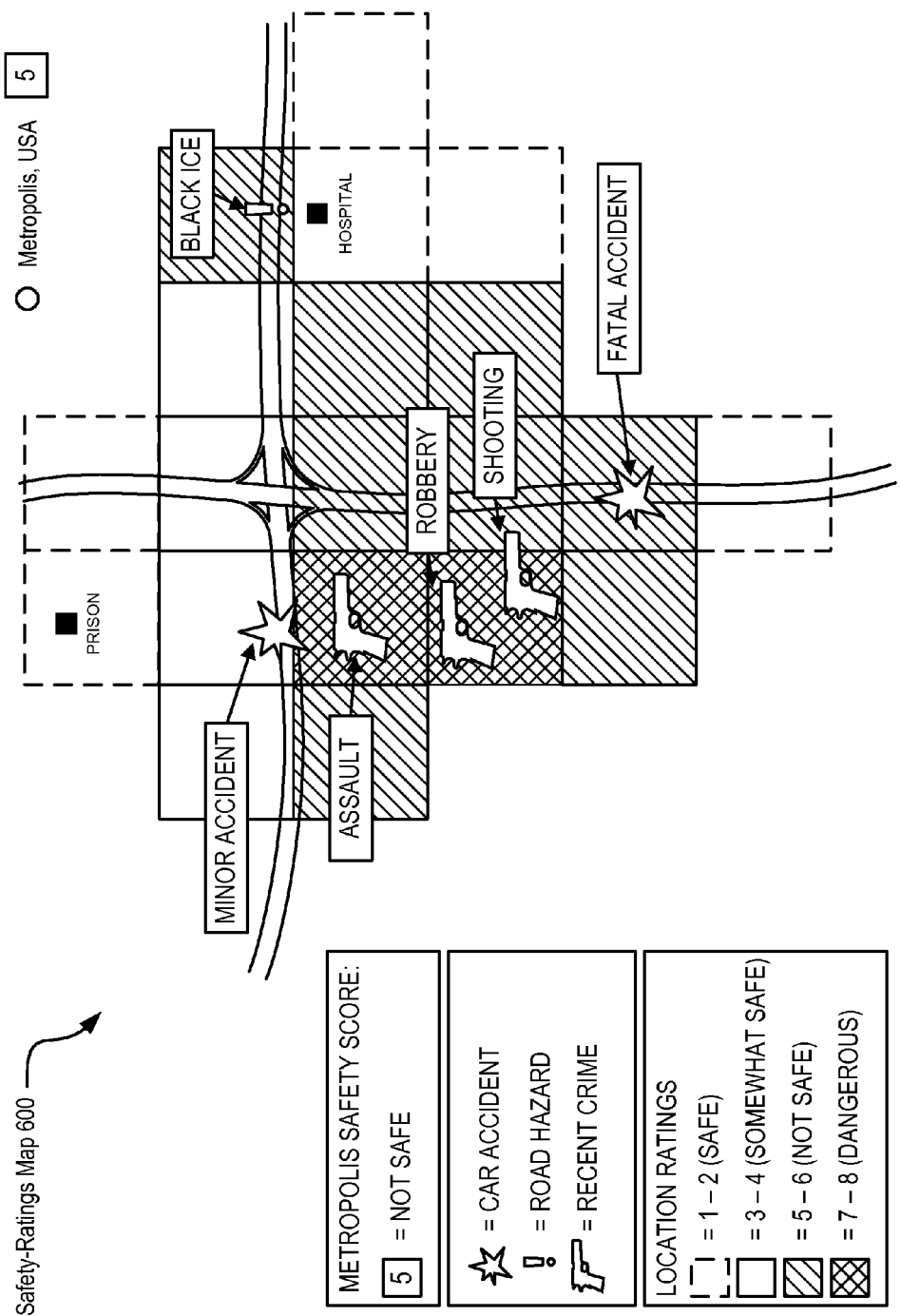
FIG. 6 is a block diagram showing an exemplary safety ratings map according to embodiments of the instant disclosure.

For example, as shown in FIG. 6, ratings module 112 may assign Metropolis a safety rating of 5 (on a scale of 1-10). In one example, Metropolis may be a city within a geographical region, such as geographical region 504. A different city within geographical region 506 may be assigned a safety rating of 3. In this scenario, it could be inferred that the city Metropolis is less safe than the city in geographical region 506. In some embodiments, empirical safety scores may be assigned to any type of geographical region. For example, a city may be assigned an overall score of 4, while a neighborhood within that city may be assigned a 7. In some examples, any size of geographical region (e.g., something as large an entire country or as small as an individual landmark) may be assigned an empirical safety score. There may be many other ways to assign empirical scoring to geographical regions, and these examples are not meant to be limiting in any way.

As noted, FIG. 6 is an exemplary illustration of a safety-ratings map 600. Safety-ratings map 600 may be a Graphical User Interface (GUI) configured to display safety ratings and emergency events for geographical regions. In some embodiments, display module 118 may be configured to display safety-ratings map 600 via a GUI. Safety-ratings map 600 may be displayed in an Internet browser or any other type or kind of GUI capable of displaying safety-ratings maps. In some embodiments, the safety ratings shown in safety-ratings map 600 may be based on safety ratings stored as safety-ratings data 126. In one example, the GUI displaying safety-ratings map 600 may be capable of displaying many geographical regions and may also provide filters that allow a user to change the type of safety ratings the GUI displays. For example, one filter may cause the GUI to display crime emergencies, while another filter may cause the GUI to display fire emergencies. FIG. 6 is one example of a GUI capable of displaying safety ratings and emergency events for a geographical region, and the present disclosure covers any other suitable type or form of representation of safety ratings.

As previously discussed, FIG. 6 is an illustration of exemplary city Metropolis. Metropolis may represent major cities or a cities surrounded by many other cities or suburbs. Within Metropolis, thousands of cell phones running instances of a security client may be configured to send information about emergency events to a remote server. In one embodiment, these cell phones may be configured to submit GPS coordinates (of their location) to the remote server once a week. A safety-ratings system, on the remote server, may determine the total number of cell phones in Metropolis by tracking these GPS submissions. The security clients on these cell phones may also include modules configured to intercept emergency calls and transmit data about those calls to the remote server. As used in the following description, the term "cell phones" refers to cell phones, within Metropolis, that are running an instance of the security client.

In some examples, a number of cell phones in Metropolis may submit, to a remote server, recordings of emergency calls and other information about emergency calls. In one embodiment, a cell phone that submits information about an emergency call may also submit GPS coordinates that indicate where the phone was located when the emergency call was made. The safety ratings system may analyze the recordings and, based on the analysis of the recordings (as well as the analysis of weekly GPS submissions and any other data), create the safety ratings shown in safety-ratings map 600.

Safety-ratings map 600 shows many different types of safety ratings. For example, the heat map of Metropolis shows a safety rating for each section of Metropolis. The heat map shows dangerous areas, where multiple or severe emergencies have occurred, and safer areas where fewer emergencies occurred. For example, the parts of Metropolis where shootings and assaults occur are shown as more dangerous than parts where road hazards occur, and parts of Metropolis where no emergencies occur are shown as the safest. In some embodiments, a safety rating may indicate whether, over a period of time, a geographical region has become more or less dangerous. For example, a heat map may show that parts of Metropolis are currently more dangerous than they were last month.

Safety-ratings map 600 shows an overall safety score of 5 for Metropolis. Safety-ratings maps 600 also shows various emergency events, such as shootings, robberies, car accidents, road hazards etc. Ratings module 112 may determine, as previously discussed, the emergency types, severities, and locations shown in safety-ratings map 600 by analyzing information about emergency communications sent from cell phones within Metropolis. Location-identification module 110 may analyze location data stored in location data 124 to determine the location of emergency events in Metropolis, and ratings module 112 may analyze and compare data in emergency communication data 122 and location data 124 to establish safety ratings for Metropolis. In at least one embodiment, ratings module 112 may create the heat map using an algorithm that compares the total number of cell phones in each section of Metropolis to the total number of emergencies within those sections. In some examples, the algorithm used to create the heat map may include any algorithm capable of creating a heat map. In some embodiments, the algorithm may also utilize any data or information suitable for creating heat maps.

As discussed in previous paragraphs, for each mobile-computing device in mobile-computing devices 202(a)-(n), safety-ratings system 208 may query the mobile-computing device for information that identifies a location to which a user of the mobile-computing device traveled after leaving the location of an emergency. Additionally, ratings module 112 may use that information to establish safety ratings for geographical regions where the emergencies occurred. For example, location-identification module 110 may, an hour after an emergency occurs in Metropolis, ping the cell phone that submitted information about the emergency. Location-identification module 110 may use the ping to identify a location to which a user of the cell phone traveled after leaving the location of the emergency. The ping may reveal that the user traveled to a prison, hospital, police station, or other emergency-related location. Ratings module 112 may use information about where a device travels after an emergency to establish safety ratings for Metropolis. For example, information about where a device travels after making an emergency call may be indicative of the type and/or severity of an emergency.

As noted, detection module 114 may determine that, based on location data from at least one device in the plurality of mobile-computing devices, a mobile-computing device is within or near a geographical location for which safety-ratings alerts are being issued. Additionally, notification module 116 may transmit an alert to the mobile-computing device that indicates a safety rating of the geographical region. Such alerts may include any type or form of alert, such as emails, text messages, instant messages, audio notifications, etc., that indicate a safety rating of a geographical region. In some embodiments, safety-ratings system 208 may include one or more systems that allow any mobile-computing device users to subscribe their mobile-computing device to receive safety alerts for specific geographical regions. As an example, if a user walks into a neighborhood with a high crime rating, safety-ratings system 208 may transmit an alert to the user that notifies the user about the rating. As another example, a user searching for a home in a particular part of a town may receive a notification that the geographical area where the user is located has high incidences of theft.

As another example, safety-ratings system 208 may determine that, based on an emergency cell phone call made to 911, a person within Metropolis is suffering from a heart attack. Detection module 114 may determine that a cell phone (e.g., that may or may not be configured to send information about emergency communications to safety-ratings system 208) is within or near the location of this medical emergency. Detection module 114 may determine that, based on the subscription information for the cell phone, that the user of the cell phone is a doctor who has elected to receive alerts about nearby medical emergencies. Notification module 116 may then send an alert to the doctor's cell phone informing him of the location and nature of the medical emergency.

As another example, detection module 114 may determine that a cell phone within Metropolis is located near a fatal car accident. In this example, safety-ratings system 208 may be configured to issue emergency alerts to mobile-computing devices that are within or near Metropolis and may send, via notification module 116, a text message to the cell phone. The text message may inform the user of the cell phone that they are nearby or approaching a dangerous section of freeway and that they should proceed with caution.

Alerts, such as the ones described above, may be sent to various mobile-computing devices in a variety of emergency events. For example, a tow truck company may subscribe to receive alerts about nearby car accidents, parents may subscribe to receive alerts if their child's cell phone has entered an unsafe area, travelers may subscribe to receive alerts about the safety of their travel destination, citizens may subscribe to receive alerts about emergencies near their home, etc. Safety-ratings system 208 may include an alerting system that can transmit the alerts described in the above examples as well as any other type or kind of alerts suitable for any situation, occurrence, or emergency.

As explained above in connection with methods 300 and 400 in FIGS. 3 and 4, embodiments described herein may provide a location safety, rating, and alerting system that may intercept user-initiated emergency data (sent from a mobile-computing device) and submit the same to a remote server for analysis. Using data intercepted in this manner (e.g. by crowd sourcing from a substantial number of cell phones or other mobile-computing devices) may facilitate a more robust and accurate safety-ratings systems than those that depend on crime reports. Also, the information contained in a mobile emergency data submission may be better suited for creating relevant and consistent emergency maps and alerting systems.

As detailed above, emergency data submissions may include information about an emergency call, such as the emergency number dialed, the GPS coordinates of the mobile-computing device when the call was made, date and time stamps that shows when the call was made, the duration of the call, NLP key words used in the call (e.g., "fire," "shooting," "heart attack," etc.), the volume of the caller, a hash of a unique device identifier (e.g., IMEI OR IMSI) that identifies the device that made the call, and any other information relevant to the call. The location safety, rating, and alerting system on the remote server may receive and analyze these emergency data submissions as well other submissions (e.g., anti-theft submissions and routine GPS coordinate submissions) and create safety-ratings based on this analysis. Also, the location safety, rating, and alerting system may create and display, via an internet browser, digital maps that show empirical location-safety scores, visual heat maps, locations of emergency events, etc. A system such as this may improve the consistency and reliability of emergency data and may establish a robust ratings system that incorporates not only crime ratings, but ratings for many other types of emergencies as well. Such a system may also be more scalable than prior solutions. For example, the safety-ratings systems described herein may be scaled to and/or implemented in any geographical region in the world with a mobile-computing device subscriber base.

Figure 7:
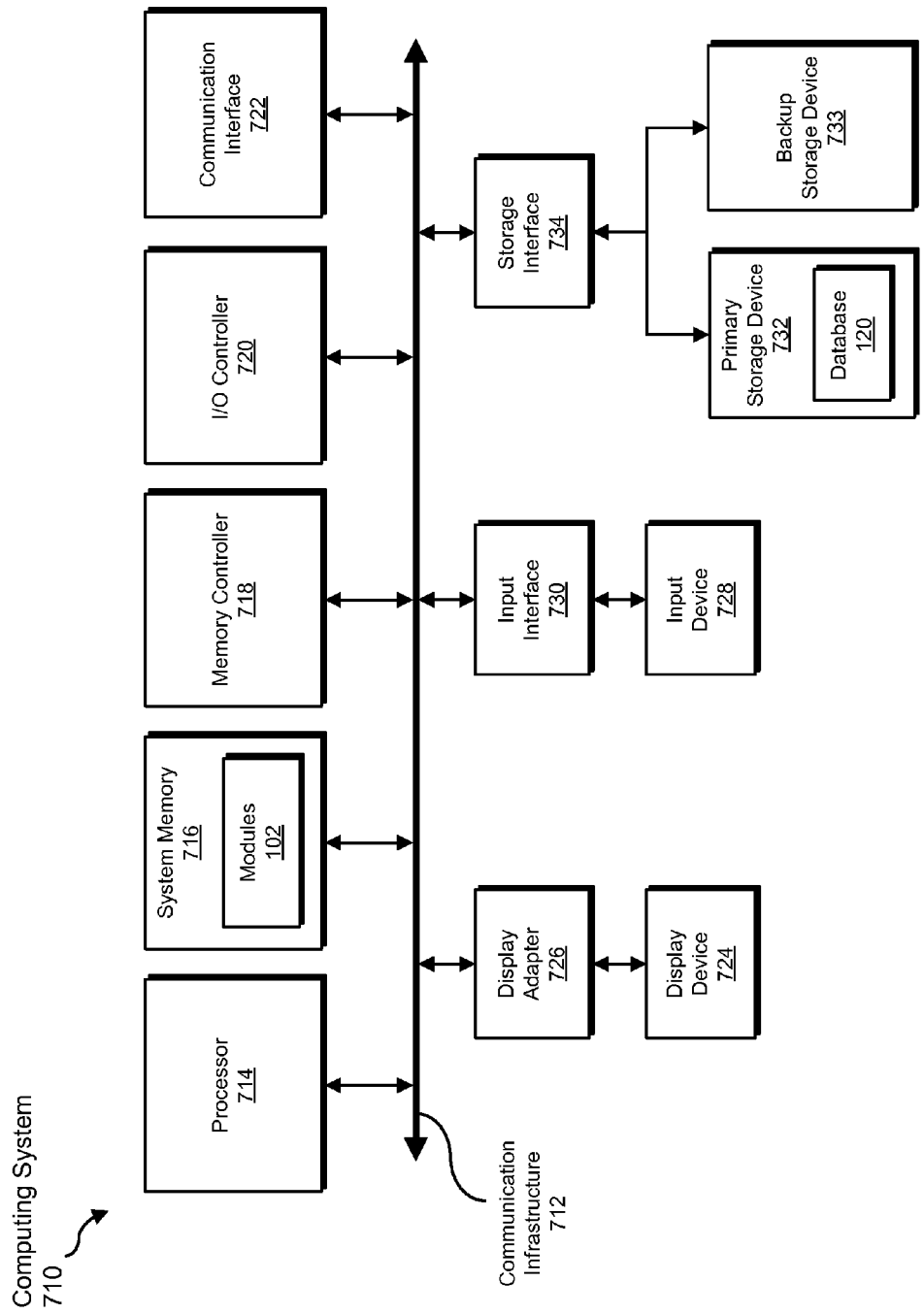
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. For example, all or a portion of computing system 710 may perform and/or be a means for performing, either alone or in combination with other elements, one or more of the steps described herein (such as one or more of the steps illustrated in FIG. 3). All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of processing unit capable of processing data or interpreting and executing instructions. In certain embodiments, processor 714 may receive instructions from a software application or module. These instructions may cause processor 714 to perform the functions of one or more of the exemplary embodiments described and/or illustrated herein.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In certain embodiments, exemplary computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an Industry Standard Architecture (ISA), Peripheral Component Interconnect (PCI), PCI Express (PCIe), or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also include at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device.

As illustrated in FIG. 7, exemplary computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710. In one example, database 120 from FIG. 1 may be stored in primary storage device 732.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 710. All or a portion of the computer program stored on the computer-readable-storage medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an Application Specific Integrated Circuit (ASIC) adapted to implement one or more of the exemplary embodiments disclosed herein.

Figure 8:
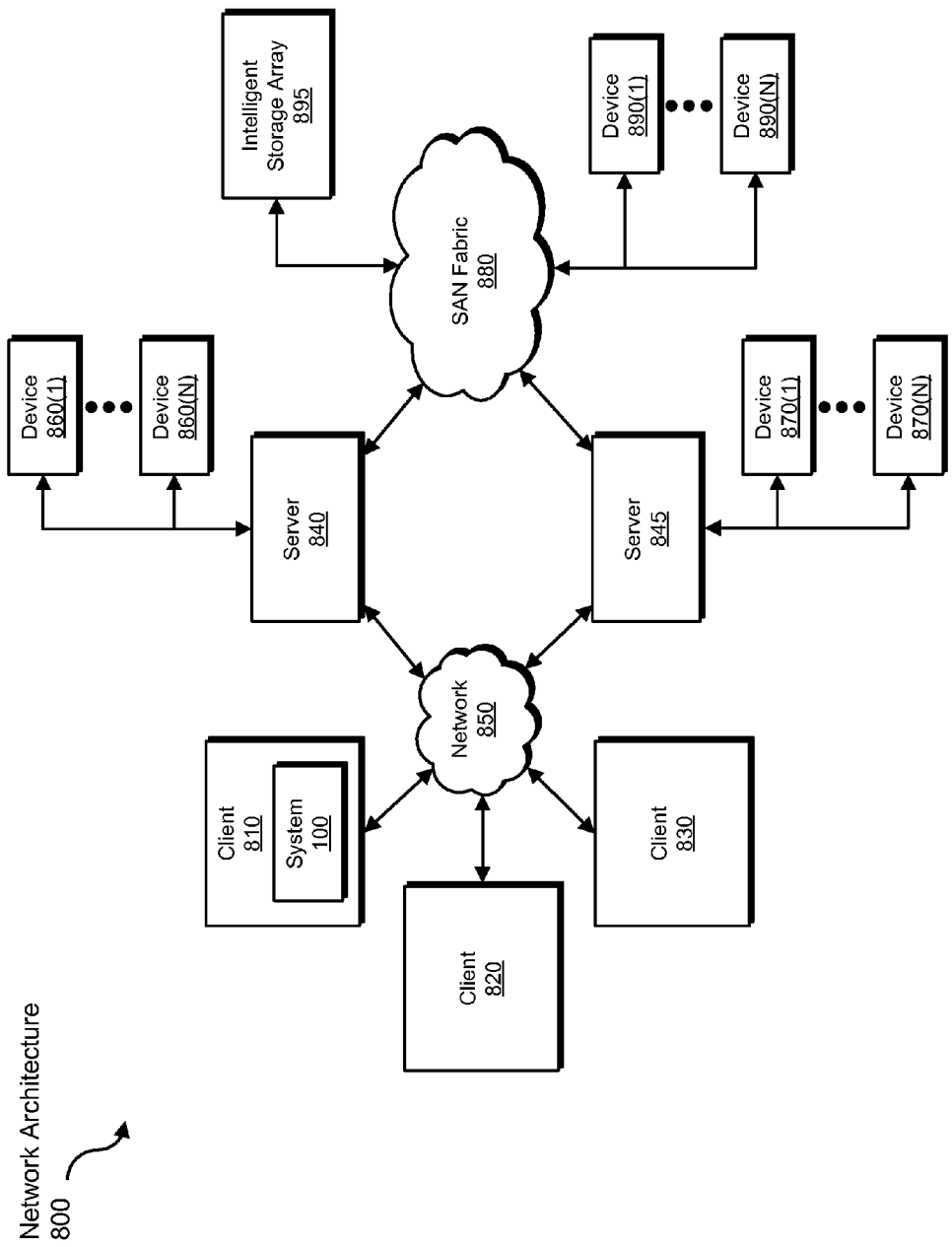
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the steps disclosed herein (such as one or more of the steps illustrated in FIG. 3). All or a portion of network architecture 800 may also be used to perform and/or be a means for performing other steps and features set forth in the instant disclosure.

Client systems 810, 820, and 830 generally represent any type or form of computing device or system, such as exemplary computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a WAN, a LAN, a PAN, or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent Network-Attached Storage (NAS) devices configured to communicate with servers 840 and 845 using various protocols, such as Network File System (NFS), Server Message Block (SMB), or Common Internet File System (CIFS).

Servers 840 and 845 may also be connected to a Storage Area Network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an exemplary method for managing emergency information.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to systemlevel configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive and/or intercept emergency communications to be transformed, transform the emergency communications, output a result of the transformation to create information about emergency communications, and use the result of the transformation to provide ratings and/or alerts. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for managing emergency information, at least a portion of the method being performed by a computing device comprising at least one processor, the method comprising:
   intercepting, on a mobile-computing device, an emergency communication being transmitted from the mobile-computing device by:
      monitoring outgoing communications from the mobile-computing device, and
      determining that an outgoing communication being monitored is a communication about an emergency;
   sending, from the mobile-computing device to a safety-ratings system that collects emergency data and creates safety ratings, information about the emergency communication and location information that identifies a location of the emergency;
   receiving, at the safety-ratings system, information about emergency communications that are intercepted while being sent from a plurality of mobile-computing devices by receiving the information about the emergency communications from the security software running on the plurality of mobile-computing devices, the plurality of mobile-computing devices comprising the mobile-computing device;
   identifying, based on location information received from the plurality of mobile-computing devices, geographical regions where emergencies associated with the emergency communications occurred;
   using the information about the emergency communications to establish safety ratings for the geographical regions where the emergencies occurred by calculating, at the safety-ratings system, the safety ratings based on an analysis of the information received from the plurality of mobile-computing devices, wherein establishing the safety ratings for the geographical regions comprises, for each geographical region being rated:
  determining a total number of mobile-computing devices within the geographical region that are capable of providing information about emergency communications;
  determining a volume of emergency communications received from one or more mobile-computing devices within the geographical region;
  normalizing the safety rating for the geographical region by comparing the total number of mobile-computing devices within the geographical region with the volume of emergency communications received from the one or more mobile-computing devices within the geographical region.

2. The computer-implemented method of claim 1, wherein:
  monitoring the outgoing communications from the mobile-computing device comprises monitoring telephone numbers dialed from the mobile-computing device;
  determining that the outgoing communication being monitored is a communication about an emergency comprises determining that a dialed telephone number is an emergency dispatch number.

3. The computer-implemented method of claim 1, wherein:
  the safety-ratings system operates as part of a server owned by a security software publisher;
  the mobile-computing devices comprise mobile-computing devices configured with security clients of the security software publisher;
  the security software comprises security software owned by the security software publisher.

4. The computer-implemented method of claim 1, further comprising querying the mobile-computing device for location information that identifies a location to which a user of the mobile-computing device traveled after leaving the location of the emergency.

5. The computer-implemented method of claim 4, wherein:
  querying the mobile-computing device comprises:
    pinging the mobile-computing device;
    using the ping to identify the location to which the user of the mobile-computing device traveled after leaving the location of the emergency;
  the method further comprises:
    using the location to which the user of the mobile-computing device traveled after leaving the location of the emergency to determine a type and/or a severity of the emergency;
    using the type and/or the severity of the emergency to establish the safety ratings for the geographical regions.

6. The computer-implemented method of claim 1, wherein establishing the safety ratings for the geographical regions comprises:
  establishing a first safety rating for a city and a second safety rating for a neighborhood within the city;
  assigning a higher safety score and/or a lower safety score to the neighborhood than to the city.

7. The computer-implemented method of claim 1, wherein monitoring the outgoing communications from the mobile-computing device comprises at least one of:
  monitoring a telephone application on the mobile-computing device;
  monitoring an application programming interface used in making phone calls from the mobile-computing device.

8. The computer-implemented method of claim 1, wherein the information about the emergency communications comprises recordings of the emergency communications.

9. The computer-implemented method of claim 8, wherein establishing the safety ratings for the geographical regions comprises, for each emergency communication, analyzing the recording of the emergency communication to determine an intensity of the emergency communication.

10. The computer-implemented method of claim 9, wherein determining the intensity of the emergency communication comprises determining the intensity by analyzing at least one of:
  a volume of a caller of the emergency communication;
  a duration of the emergency communication;
  natural language processed key words used in the emergency communication.

11. The computer-implemented method of claim 1, wherein establishing the safety ratings for the geographical regions comprises analyzing anti-theft submissions from one or more mobile-computing devices in the plurality of mobile-computing devices.

12. The computer-implemented method of claim 11, wherein analyzing the anti-theft submissions comprises analyzing a probability of a theft incident.

13. The computer-implemented method of claim 1, further comprising:
  determining that a mobile-computing device from the plurality of mobile-computing devices is located within or near a geographical region for which a safety rating has been established;
  sending, to the mobile-computing device located within or near the geographical region, information about the safety rating of the geographical region.

14. The computer-implemented method of claim 1, further comprising:
  determining that an additional mobile-computing device is located near an emergency associated with an emergency communication received from a mobile-computing device in the plurality of mobile-computing devices;
  sending, to the additional mobile-computing device, information about the emergency.

15. A non-transitory computer-readable-storage medium comprising one or more computer-readable instructions that, when executed by at least one processor of a computing device, cause the computing device to:
  intercept, on a mobile-computing device, an emergency communication being transmitted from the mobile-computing device by:
    monitoring outgoing communications from the mobile-computing device, and
    determining that an outgoing communication being monitored is a communication about an emergency;
  send, from the mobile-computing device to a safety-ratings system that collects emergency data and creates safety-ratings, information about the emergency communication and location information that identifies a location of the emergency;
  receive, at the safety-ratings system, information about emergency communications that are intercepted while being sent from a plurality of mobile-computing devices by receiving the information about the emergency communications from security software running on the plurality of mobile-computing devices, the plurality of mobile-computing devices comprising the mobile-computing device;

identify, based on location information received from the plurality of mobile-computing devices, geographical regions where emergencies associated with the emergency communications occurred;

use the information about the emergency communications to establish safety ratings for the geographical regions where the emergencies occurred by calculating, at the safety-ratings system, the safety ratings based on an analysis of the information received from the plurality of mobile-computing devices, wherein establishing the safety ratings for the geographical regions comprises, for each geographical region being rated:

determining a total number of mobile-computing devices within the geographical region that are capable of providing information about emergency communications;

determining a volume of emergency communications received from one or more mobile-computing devices within the geographical region;

normalizing the safety rating for the geographical region by comparing the total number of mobile-computing devices within the geographical region with the volume of emergency communications received from the one or more mobile-computing devices within the geographical region.

16. A system comprising:

an interception module that intercepts, on a mobile-computing device, an emergency communication being transmitted from the mobile-computing device by:
 monitoring outgoing communications from the mobile-computing device, and
 determining that an outgoing communication being monitored is a communication about an emergency;

a transmission module that sends, from the mobile-computing device to a safety-ratings system that collects emergency data and creates safety-ratings, information about the emergency communication and location information that identifies a location of the emergency;

a reception module that receives, at the safety-ratings system, information about emergency communications that are intercepted while being sent from a plurality of mobile-computing devices by receiving the information about the emergency communications from security software running on the plurality of mobile-computing devices, the plurality of mobile-computing devices comprising the mobile-computing device;

a location-identification module that identifies, based on location information received from the plurality of mobile-computing devices, geographical regions where emergencies associated with the emergency communications occurred;

a ratings module that uses the information about the emergency communications to establish safety ratings for the geographical regions where the emergencies occurred by calculating, at the safety-ratings system, the safety ratings based on an analysis of the information received from the plurality of mobile-computing devices, wherein the ratings module establishes the safety ratings for the geographical regions by, for each geographical region being rated:

determining a total number of mobile-computing devices within the geographical region that are capable of providing information about emergency communications;

determining a volume of emergency communications received from one or more mobile-computing devices within the geographical region;

normalizing the safety rating for the geographical region by comparing the total number of mobile-computing devices within the geographical region with the volume of emergency communications received from the one or more mobile-computing devices within the geographical region;

at least one hardware processor in the safety-ratings system, the hardware processor being configured to execute the interception module, the transmission module, the reception module, the location-identification module, and the ratings module.

17. The system of claim 16, further comprising:

a detection module that determines that, based on location data from at least one device in the plurality of mobile-computing devices, the mobile-computing device is within or near a geographical location for which safety-rating alerts are being issued;

a notification module that transmits an alert to the mobile-computing device, the alert indicating a safety rating of the geographical location, wherein the notification module and the detection module are located in the safety-ratings system.

18. The system of claim 16, further comprising a display module that displays, via a graphical user interface, a map showing representations of the geographical regions and representations of the safety ratings of the geographical regions.

19. The system of claim 16, wherein:

monitoring the outgoing communications from the mobile-computing device comprises monitoring telephone numbers dialed from the mobile-computing device;

determining that the outgoing communication being monitored is a communication about an emergency comprises determining that a dialed telephone number is an emergency dispatch number.

20. The system of claim 16, wherein:

the safety-ratings system operates as part of a server owned by a security software publisher;

the mobile-computing devices comprise mobile-computing devices configured with security clients of the security software publisher;

the security software comprises security software owned by the security software publisher.

* * * * *